United States Patent
McEvilly

(10) Patent No.: US 11,903,365 B2
(45) Date of Patent: Feb. 20, 2024

(54) ANIMAL BLANKET

(71) Applicant: X-Spand Equine LLC, Litchfield Park, AZ (US)

(72) Inventor: Molly Elizabeth McEvilly, Litchfield Park, AZ (US)

(73) Assignee: X-SPAND EQUINE LLC, Litchfield Park, AZ (US)

( * ) Notice: Subject to any disclaimer, the term of this patent is extended or adjusted under 35 U.S.C. 154(b) by 0 days.

(21) Appl. No.: 16/850,106

(22) Filed: Apr. 16, 2020

(65) Prior Publication Data

US 2020/0329670 A1 Oct. 22, 2020

Related U.S. Application Data

(60) Provisional application No. 62/834,506, filed on Apr. 16, 2019.

(51) Int. Cl.
*A01K 13/00* (2006.01)
*B68C 5/00* (2006.01)

(52) U.S. Cl.
CPC .............. *A01K 13/008* (2013.01); *B68C 5/00* (2013.01)

(58) Field of Classification Search
CPC ....... A01K 13/008; A01K 13/006; B68C 5/00
See application file for complete search history.

(56) References Cited

U.S. PATENT DOCUMENTS

| | | | | |
|---|---|---|---|---|
| 185,201 A | * | 12/1876 | Adams | A01K 13/008 54/79.2 |
| 224,468 A | * | 2/1880 | Palmer | A01K 13/008 54/79.2 |
| 896,446 A | * | 8/1908 | Gordon | A01K 13/008 54/79.2 |
| 4,214,421 A | * | 7/1980 | Battle | A01K 13/008 54/79.2 |
| 4,823,540 A | * | 4/1989 | Kosarek | A01K 13/008 54/80.1 |
| 5,125,220 A | * | 6/1992 | Martin | A01K 13/008 54/79.2 |
| 5,161,352 A | * | 11/1992 | Schneider | A01K 13/006 54/79.2 |
| 5,361,563 A | * | 11/1994 | Llamas | A01K 13/008 54/79.2 |
| 5,839,395 A | * | 11/1998 | Kelley | A01K 13/008 54/79.2 |

(Continued)

FOREIGN PATENT DOCUMENTS

| | | | | |
|---|---|---|---|---|
| CA | 2484576 A1 | * | 5/2006 | ........... A01K 13/008 |
| DE | 202011001736 U1 | * | 4/2011 | ........... A01K 13/008 |

OTHER PUBLICATIONS

Machine translation of DE-202011001736-U1 (Year: 2021).*
Machine translation of CA-2484576-A1 (Year: 2021).*

*Primary Examiner* — Jessica B Wong
(74) *Attorney, Agent, or Firm* — Taft Stettinius & Hollister LLP; Derek B. Lavender

(57) ABSTRACT

A blanket with a first section having both a first end and a second end, and a second section that is at least partially formed from an elastic material and coupled to the first section. The first and second sections of this blanket are configured to be positioned on an animal, with the second section coupled to the first section and positioned at least partially along a chest area of the animal.

13 Claims, 1 Drawing Sheet

(56) References Cited

U.S. PATENT DOCUMENTS

| | | | | |
|---|---|---|---|---|
| 6,234,117 B1* | 5/2001 | Spatt | ............ | A01K 13/006 |
| | | | | 119/850 |
| 2002/0043054 A1* | 4/2002 | Gatto | ............ | A01K 13/008 |
| | | | | 54/79.4 |
| 2006/0042200 A1* | 3/2006 | Kwan | ............ | A01K 13/008 |
| | | | | 54/79.2 |
| 2008/0067163 A1* | 3/2008 | Axinte | ............ | A01K 13/008 |
| | | | | 219/211 |
| 2008/0216454 A1* | 9/2008 | Lacow | ............ | A01K 13/008 |
| | | | | 54/79.2 |
| 2013/0263561 A1* | 10/2013 | Caston | ............ | A01K 13/008 |
| | | | | 54/79.2 |
| 2014/0331943 A1* | 11/2014 | Roberson | ............ | A01K 3/005 |
| | | | | 119/758 |
| 2015/0208611 A1* | 7/2015 | Russakoff | ............ | A01K 13/006 |
| | | | | 54/79.2 |
| 2019/0104705 A1* | 4/2019 | Heintz | ............ | A01K 13/008 |

* cited by examiner

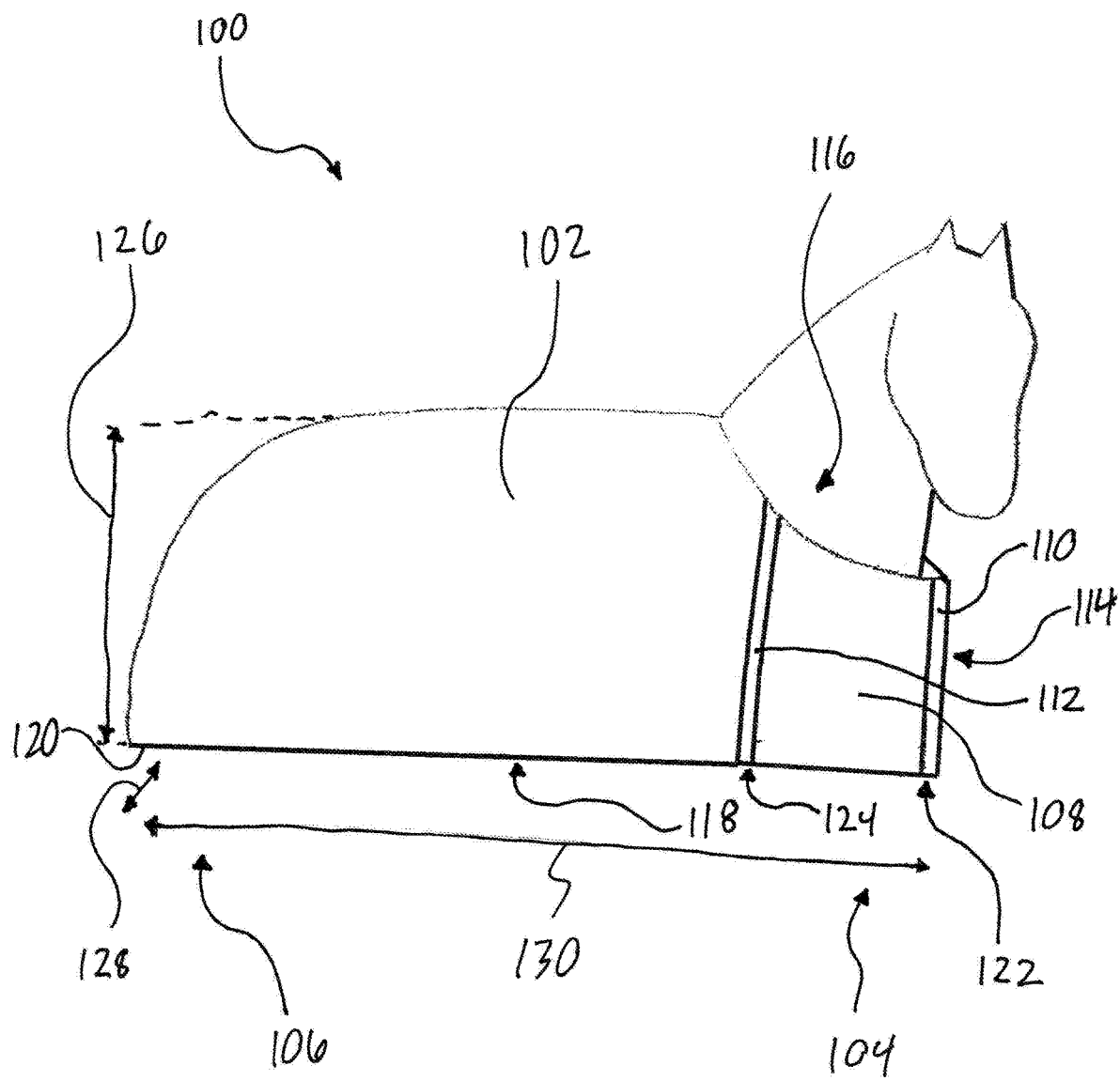

ANIMAL BLANKET

RELATED APPLICATIONS

This application claims priority to U.S. Provisional Application Ser. No. 62/834,506, filed Apr. 16, 2019, the disclosure of which is hereby incorporated by reference in its entirety.

FIELD OF THE DISCLOSURE

The present disclosure relates to a blanket, and more specifically to an animal blanket that expands to accommodate movement of the animal.

BACKGROUND OF THE DISCLOSURE

Animal blankets, such as blankets for horses, are used for many different reasons. As one example, animal blankets may be used to shelter and/or insulate the animal from adverse weather conditions. These blankets are used to help protect animals from the elements of nature by at least partially covering the animal with the blanket. Modern animal blankets typically have one or more fasteners in the front chest area of the animal to help keep the blanket on the animal securely. Typical fasteners include bulky clips, straps, or other mechanisms for fastening. These fasteners are likely to cause discomfort to the animal and may limit the mobility of the animal. Further, the typical fasteners used for animal blankets may cause bruising or abrasions to the soft tissue of the animal. Accordingly, there is a need for an animal blanket that will comfortably secure the blanket to the animal while minimizing injury caused by the fasteners and the like.

SUMMARY

One embodiment of the present disclosure is a blanket with a first section having both a first end and a second end, and a second section that is at least partially formed from an elastic material and coupled to the first section. The first and second sections of this blanket are configured to be positioned on an animal, with the second section coupled to the first section and positioned at least partially along a chest area of the animal.

In one example of this embodiment, the first section is coupled to the second section at the first end to define a neck aperture, and the second section permits expansion and contraction of the neck aperture. The second section is also coupled to the first section in a manner to define a pocket therein, the pocket sized to receive the body of an animal therein. The second section may elastically deform to change the size of the pocket, reacting to the forces exerted upon it.

In another example of this embodiment, the second section is coupled to the first section at a first seam and a second seam, the first and second seams being spaced from one another. When the blanket is positioned on an animal the first seam is positioned to be offset to a first side and the second seam is positioned to be offset to a second side. The first section and second section are coupled to each other with at least a double stitch.

In another example of this embodiment, the first section of the blanket is formed of a different material than the second section. The elastic material of the second section may be sport nylon spandex, and may be about 80% nylon and about 20% spandex. The first section is formed, in part, of fibers having a linear mass density of about 1200 denier. The first section has an insulation layer and the second section does not have an insulation layer. The insulation layer of the first section may be fleece or 100% cotton.

Another embodiment is an animal blanket that has a first section formed of a substantially inelastic material and having a first end and a second end and a second section being at least partially formed from an elastic material and coupled to the first section to form a neck aperture. The second section is coupled to the first section to be positioned at least partially along a chest area of the animal. The second section also permits expansion and contraction of the neck aperture.

In one example of this embodiment, the elastic material is 80% nylon and 20% spandex. In one aspect of this example, the first section is formed of fibers having a linear mass density of about 1200 denier.

Yet another embodiment is a method of manufacturing an animal blanket. The method includes partially defining a neck aperture in a first section formed of a materially that is substantially inelastic, partially defining the neck aperture with a second section formed of an elastic material that is about 80% nylon and about 20% spandex, and coupling the first section to the second section to form a pocket sized to receive at least a portion of an animal, the first and second section being coupled to one another to fully form the neck aperture. The portion of the neck aperture defined by the second section is positioned to be aligned with a chest portion of the animal and the elastic properties of the second section allow the pocket and neck aperture to elastically deform to different sizes.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1 is a side view of the blanket on a horse.

Corresponding reference numerals are used to indicate corresponding parts throughout view.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Blankets can be used by animal owners to keep animals warm or otherwise protect the animal from the surrounding environment. A blanket can include one or more sections coupled together. When the blanket is placed on the animal, it creates a barrier between the animal and the surrounding environment, at least partially protecting the animal from cold, wind, rain, and other elements that may cause harm or discomfort to the animal. Further, the blanket may be configured to protect the animal from insects and the like.

While the term "blanket" is used throughout, this disclosure contemplates utilizing the teachings discussed herein for any type of covering or garment that may be positioned on or around an animal. Referring now to FIG. 1, a blanket 100 includes a first section 102, with a first end 104 and a second end 106. The first section 102 is generally intended to be positioned over the back of the animal and at least partially around the animal's trunk. The blanket 100 further includes a second section 108 being at least partially formed from an elastic material. The second section 108 is generally intended to be positioned along the chest of the animal in front of the animal's front most legs. In one aspect of this disclosure, the blanket 100 may be sized to be positioned around a horse. However, it is also contemplated herein to size the blanket 100 to fit around other animals such as cows, dogs, cats, pigs, sheep, goats, and the like to name just a few examples of embodiments considered herein.

In one aspect of this disclosure, the second section 108 may be coupled to the first section 102 with a first seam 110 and a second seam 112. The first seam 110 and the second seam 112 may be biased towards the first end 104 to position the second section 108 along a chest portion of the animal. Further, the first seam 110 and the second seam 112 may be spaced from one another to be positioned along substantially opposite sides of the animal. More specifically, the first seam 110 may be positioned to be offset to a first side 122, and the second seam may be positioned to be offset to a second side 124. As illustrated in FIG. 1, the second section 108 may extend from a neck aperture 116 to a bottom end 120. However, other embodiments considered herein may not include a second section 108 that extends entirely to the bottom end 120. In other embodiments, the second section 108 may be a U-shaped section coupled to the first section 102 and extending from the neck aperture 116 towards the bottom end 120. In this embodiment, the second section 108 may not extend entirely to the bottom end 120. Accordingly, many different shapes of a second section 108 are contemplated herein and incorporate the teachings of this disclosure.

The first seam 110 and the second seam 112 may couple the first section 102 to the second section 108 utilizing any known coupling method. In one non-exclusive example, both the first and second section 102, 108 may be formed of a material that may be stitched together. In this non-exclusive example, the first and second seams 110, 112 may be formed of a double stitched seam to thereby couple the first portion 102 to the second portion 108. However, this disclosure contemplates implementing any known coupling method for coupling the first section 102 to the second section 108. In other non-exclusive embodiments, the first and second seams 110, 112 may utilize Velcro, snaps, zippers, or any other known fastener to couple the first section 102 to the second section 108.

The first section 102 and second section 108 of the blanket 100 may be sized to be positioned on, or partially around an animal. More specifically, in the embodiment illustrated in FIG. 1, the second section 108 may be positioned at least partially along a chest area 114 of the animal. Further, in one aspect of this disclosure the second section 108 may be about 18 inches wide and about 22 inches long. However, as a person skilled in the relevant art understands the width and length of the second section may vary based on the size of the animal for which the blanket is intended to be used.

The first section 102 of the blanket 100 may be formed from a different material than the second section 108. In one non-exclusive example, the first section 102 may be formed, in part, of fibers having a linear density of about 1200 denier. In other examples, the first section may be formed of a material having a linear density of less than 1200 denier. Further still, other examples utilize a material for the first section that has a linear density of greater than 1200 denier.

Further, the material of the first section 102 may be substantially inelastic. In other words, the material of the first section 102 may not substantially stretch under tension. In one aspect of this disclosure, the first section 102 may also have an insulation layer. The insulation layer of the first section 102 may be made of a material that is at least partially fleece. In another embodiment, the first section 108 may comprise of a material that is 100% cotton. While specific materials are discussed herein for the insulation layer, this disclosure contemplates utilizing any material known for providing insulation when applied to a blanket or the like. Further, while this disclosure discusses implementing an insulation layer to the first section 102, in at least one embodiment the first section 102 may be entirely formed of an insulating material and not have a separate insulation layer.

The second section 108 may be made of an elastic material that is at least partially sport nylon spandex. More specifically, in one non-exclusive example the elastic material of the second section 108 may be about 80% nylon and about 20% spandex. Further, the second section 108 may be formed of a high quality tricot four way stretch material that offers great stretching and recovery, good strength, and abrasion resistance as well as wonderful memory to retain its shape.

While specific examples of material for the second section 108 are discussed herein, this disclosure contemplates utilizing any material that has elastic properties. Accordingly, the examples discussed herein are not meant to be an exhaustive list of all materials considered. Rather, the second section 108 may be formed of any elastic material that promotes mobility of the animal and reduces abrasive contact thereto.

In one non-exclusive example of this disclosure, the second section 108 may not have an insulation layer. More specifically, the second section 108 may hold the first section 102 in proper positioning on the animal to ensure the animal stays warm. Accordingly, in one non-limiting example the first section 102 may have an additional insulation layer while the second section 108 may not have an additional insulation layer. However, in other embodiments both the first and second sections 102, 108 have an additional insulation layer.

The first section 102 may be coupled to the second section 108 at the first end 104 in a manner that produces the neck aperture 116 at the first end 104. The neck aperture 116 may be a substantially circular aperture formed by the first and second sections 102, 108. More specifically, the first section 102 may form an arc-shaped section of the neck aperture 116 and the second section 108 may form another arc-shaped section of the neck aperture 116. Further, the first and second sections 102, 108 may be coupled to one another so that that arc-shaped portions together form the entire perimeter of the neck aperture 116. In this configuration, the neck aperture 116 may expand and contract under certain conditions because at least a portion of the neck aperture 116 is formed of the elastic material of the second section 108.

In one aspect of this disclosure, the first and second sections 102, 108 may be coupled to one another to form a pocket 118 sized to receive a portion of the animal therein. The pocket 118 may be the portion of the blanket inside of a height of the blanket 126, a width of the blanket 128, and a length of the blanket 130. The elastic properties of the second section 108 allows the pocket 118 to at least partially expand and contract. More specifically, since the second section 108 is formed of an elastic material and partially forms the pocket 118, the size of the pocket 118 may be altered as the elastic second section 108 expands and contracts under corresponding forces.

In one non-exclusive example, the bottom end 120 of the pocket 118 is partially enclosed. More specifically, the bottom end 120 of the pocket 118 may be at least partially selectively enclosed by a third section of material in a manner known in the art. In this embodiment there may be leg apertures at the bottom end 120 at both the first end 104 and the second end 106. The third section may be selectively coupled to the first section 102 utilizing any known fastener to further ensure the animal blanket 100 remains properly positioned on the animal. In another embodiment of this disclosure, the bottom end 120 of the pocket 118 is open and there is no third section at all.

In one aspect of this disclosure, the animal blanket 100 may be specifically sized to accommodate a horse of a certain size. In this configuration, the pocket 118 may be sized to fit around a portion of the body of the horse and the neck aperture 116 is sized to allow the horse's head and neck to be positioned there through. In this non-exclusive example, the horses head may be guided through the neck aperture 116 and the second section 102 of the blanket 100 may be draped over the horse's back and trunk. The second section 108 may be positioned along chest area of the horse. Once positioned thereon, the horse may freely move with the blanket positioned thereon without being substantially restricted by the blanket 100. More specifically, if the horse lays on the ground or otherwise moves out of a standing position the elastic second section 108 may allow the pocket 118 of the blanket to expand to accommodate the changing contours of the horse. Further, the elastic material of the second section 108 may not substantially harm the soft tissue of the horse while maintaining the blanket in proper position thereon.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An animal blanket, consisting of:
a first section; and
a second section being formed from an elastic material and stitched to the first section to form a neck aperture wherein the second section is more elastic relative to the first section;
wherein the first section defines a first arc-shaped section and the second section defines a second arc-shaped section and a perimeter of the neck aperture is formed in part by both the first arc-shaped section and the second arc-shaped section to allow the elastic material of the second section to selectively expand the size of the neck aperture;
wherein the second section extends from the neck aperture to a bottom end of the first section;
wherein the perimeter of the neck aperture is exclusively defined by the first section along the first arc-shaped section and the second section along the second arc-shaped section.

2. The blanket of claim 1, further wherein the first and second sections are configured to be positioned on an animal, the second section is coupled to the first section to be positioned at least partially along a chest area of the animal, and the first section is configured to be positioned at least partially along a back of the animal.

3. The blanket of claim 1, further wherein the second section permits expansion and contraction of the neck aperture.

4. The blanket of claim 1, further wherein the first section is formed of a different material than the second section.

5. The blanket of claim 4, further wherein the elastic material is sport nylon spandex.

6. The blanket of claim 5, further wherein the elastic material is 80% nylon and 20% spandex.

7. The blanket of claim 4, further wherein the first section is formed, in part, of fibers having a linear mass density of 1200 denier.

8. The blanket of claim 1, further wherein the second section is coupled to the first section to define a pocket, the pocket sized to at least partially receive the body of an animal therein.

9. The blanket of claim 8, further wherein the second section elastically deforms to change the size of the pocket.

10. An animal blanket, consisting of:
a first section formed of an inelastic material; and
a second section being formed from an elastic material and fixedly coupled to the first section to form a neck aperture exclusively from the first section along a first arc-shaped section and exclusively from the second section along a second arc-shaped section;
wherein the inelastic material is less elastic relative to the elastic material;
wherein the second section is coupled to the first section to partially form a perimeter of the neck aperture and to be positioned at least partially along a chest area of the animal; and
further wherein the second section permits expansion and contraction of the neck aperture;
further wherein the second material is configured to at least partially cover a back of the animal.

11. The blanket of claim 10, further wherein the elastic material is 80% nylon and 20% spandex.

12. The blanket of claim 10, further wherein the first section is formed of fibers having a linear mass density of 1200 denier.

13. A method of manufacturing an animal blanket, consisting of:
partially defining a neck aperture in a first section exclusively formed of a material that is inelastic;
partially defining the neck aperture with a second section exclusively formed of an elastic material that is 80% nylon and 20% spandex wherein the elastic material is more elastic relative to the inelastic material; and
coupling the first section to the second section to form a pocket sized to receive at least a portion of an animal, the first and second section being fixedly coupled to one another to fully form a perimeter the neck aperture;
wherein the portion of the perimeter of the neck aperture defined by the second section is positioned to be aligned with a chest portion of the animal; and
further wherein the elastic properties of the second section allow the pocket and neck aperture to elastically deform to different sizes.

* * * * *